United States Patent
Tod et al.

(10) Patent No.: US 11,648,953 B2
(45) Date of Patent: *May 16, 2023

(54) SYSTEMS AND METHODS FOR MAINTAINING VEHICLE STATE INFORMATION

(71) Applicant: CLEARPATH ROBOTICS INC., Kitchener (CA)

(72) Inventors: Anthony William Tod, St. Agatha (CA); David Andrew Brown, Kitchener (CA); Guillaume Autran, Kitchener (CA); Ryan Christopher Gariepy, Kitchener (CA); Bryan Webb, Kitchener (CA); Matthew Allen Rendall, Waterloo (CA)

(73) Assignee: CLEARPATH ROBOTICS INC., Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/553,662

(22) Filed: Dec. 16, 2021

(65) Prior Publication Data

US 2022/0212681 A1    Jul. 7, 2022

Related U.S. Application Data

(63) Continuation of application No. 16/253,308, filed on Jan. 22, 2019, now Pat. No. 11,235,778.
(Continued)

(51) Int. Cl.
*B60W 50/02* (2012.01)
*G05D 1/02* (2020.01)
(Continued)

(52) U.S. Cl.
CPC ....... *B60W 50/0205* (2013.01); *G05D 1/0088* (2013.01); *G05D 1/0297* (2013.01);
(Continued)

(58) Field of Classification Search
CPC ...... B60W 50/0205; B60W 2050/0215; G05D 1/0088; G05D 1/0297; G05D 2201/0213; G07C 5/008; G07C 5/085
See application file for complete search history.

(56) References Cited

U.S. PATENT DOCUMENTS

| 5,199,524 A | 4/1993 | Ivancic |
| 6,668,318 B1 | 12/2003 | Jenkins et al. |
(Continued)

FOREIGN PATENT DOCUMENTS

| WO | 2013096651 A1 | 6/2013 |
| WO | 2017072771 A1 | 5/2017 |

OTHER PUBLICATIONS

Eric Park, Linda Kobayashi and Susan Lee: "Extensible Hardware Architecture for Mobile Robots" Intelligent Robotics Group Apr. 18, 2005.(6 pages).
(Continued)

*Primary Examiner* — Luis A Martinez Borrero (57) ABSTRACT

Systems and methods for monitoring a fleet of self-driving vehicles are disclosed. The system comprises one or more self-driving vehicles having at least one sensor for collecting current state information, a fleet-management system, and computer-readable media for storing reference data. The method comprises autonomously navigating a self-driving vehicle in an environment, collecting current state information using the vehicle's sensor, comparing the current state information with the reference data, identifying outlier data in the current state information, and generating an alert based on the outlier data. A notification based on the alert may be sent to one or more monitoring devices according to the type and severity of the outlier.

20 Claims, 5 Drawing Sheets

Related U.S. Application Data (60) Provisional application No. 62/621,519, filed on Jan. 24, 2018.

(51) Int. Cl.
*G05D 1/00* (2006.01)
*G07C 5/00* (2006.01)
*G07C 5/08* (2006.01)

(52) U.S. Cl.
CPC .............. *G07C 5/006* (2013.01); *G07C 5/008* (2013.01); *G07C 5/085* (2013.01); *B60W 2050/0215* (2013.01); *G05D 2201/0213* (2013.01)

(56) References Cited

U.S. PATENT DOCUMENTS

| | | | |
|---|---|---|---|
| 7,409,356 B1 | 8/2008 | Geddes et al. | |
| 7,532,962 B1* | 5/2009 | Lowrey | G01M 15/04 340/439 |
| 7,565,581 B1* | 7/2009 | Halligan | G06F 11/076 714/6.32 |
| 7,650,210 B2* | 1/2010 | Breed | G07C 5/008 701/31.9 |
| 7,734,389 B2* | 6/2010 | Shin | B60W 50/04 701/33.4 |
| 7,826,919 B2 | 11/2010 | D'Andrea et al. | |
| 7,894,932 B2 | 2/2011 | Mountz et al. | |
| 7,894,933 B2 | 2/2011 | Mountz et al. | |
| 7,912,574 B2 | 3/2011 | Wurman et al. | |
| 8,190,322 B2* | 5/2012 | Lin | G07C 5/008 701/31.4 |
| 8,220,710 B2 | 7/2012 | Hoffman et al. | |
| 8,457,808 B2 | 6/2013 | Michnik et al. | |
| 8,502,498 B2 | 8/2013 | Fecher | |
| 8,660,740 B2* | 2/2014 | Koniditsiotis | G07C 5/008 177/136 |
| 8,761,989 B1 | 6/2014 | Murphy | |
| 8,914,182 B2 | 12/2014 | Casado et al. | |
| 9,315,178 B1* | 4/2016 | Ferguson | B60W 30/12 |
| 9,606,544 B2 | 3/2017 | Gariepy et al. | |
| 9,766,671 B2 | 9/2017 | Dorn et al. | |
| 10,055,903 B2* | 8/2018 | Koons | G07C 5/0808 |
| 10,109,120 B2* | 10/2018 | Boss | G07C 5/0816 |
| 10,241,509 B1* | 3/2019 | Fields | A61B 5/4094 |
| 10,262,475 B2* | 4/2019 | Smith | G07C 5/008 |
| 10,423,934 B1* | 9/2019 | Zanghi | G06Q 10/1097 |
| 10,565,807 B2* | 2/2020 | Boss | G07C 5/0816 |
| 10,717,448 B1 | 7/2020 | Seo | |
| 10,726,644 B2* | 7/2020 | Abari | G06N 20/00 |
| 10,824,145 B1* | 11/2020 | Konrardy | G08G 1/0965 |
| 10,846,947 B2* | 11/2020 | Pakki | B60W 50/0205 |
| 10,867,455 B2* | 12/2020 | Segal | G07C 5/008 |
| 11,100,731 B2* | 8/2021 | Smith | G07C 5/008 |
| 11,235,778 B2* | 2/2022 | Tod | B60W 50/0205 |
| 2004/0039504 A1* | 2/2004 | Coffee | B28C 7/02 701/482 |
| 2004/0158355 A1 | 8/2004 | Holmqvist et al. | |
| 2007/0005202 A1* | 1/2007 | Breed | G07C 5/0808 714/25 |
| 2007/0129847 A1 | 6/2007 | Ulmer et al. | |
| 2008/0009965 A1 | 1/2008 | Bruemmer et al. | |
| 2008/0009966 A1 | 1/2008 | Bruemmer et al. | |
| 2008/0028237 A1 | 1/2008 | Knight | |
| 2008/0103650 A1* | 5/2008 | Shin | B60W 50/0205 701/33.4 |
| 2008/0262669 A1 | 10/2008 | Smid et al. | |
| 2008/0284575 A1* | 11/2008 | Breed | B60N 2/2863 701/31.4 |
| 2008/0291879 A1 | 11/2008 | Duff et al. | |
| 2009/0043441 A1* | 2/2009 | Breed | G07C 5/085 701/31.9 |
| 2009/0074545 A1 | 3/2009 | Lert, Jr. et al. | |
| 2009/0077808 A1 | 3/2009 | Malm | |
| 2009/0160255 A1 | 6/2009 | Grady | |
| 2009/0304101 A1 | 12/2009 | Loporto et al. | |
| 2010/0060604 A1 | 3/2010 | Zwart et al. | |
| 2011/0031929 A1 | 2/2011 | Asada et al. | |
| 2011/0035139 A1* | 2/2011 | Koniditsiotis | G08G 1/207 701/119 |
| 2011/0144823 A1 | 6/2011 | Muller et al. | |
| 2011/0202305 A1* | 8/2011 | Willis | G07C 5/085 702/141 |
| 2012/0019205 A1 | 1/2012 | Kressner et al. | |
| 2012/0101627 A1 | 4/2012 | Lert | |
| 2012/0179337 A1 | 7/2012 | Doan | |
| 2012/0239224 A1 | 9/2012 | Mccabe et al. | |
| 2013/0000438 A1 | 1/2013 | Ouellet | |
| 2013/0006677 A1 | 1/2013 | Anglin et al. | |
| 2013/0035823 A1 | 2/2013 | Yoshida | |
| 2013/0179057 A1 | 7/2013 | Fisher et al. | |
| 2013/0248547 A1 | 9/2013 | Braun et al. | |
| 2014/0074345 A1* | 3/2014 | Gabay | G07C 5/008 701/33.9 |
| 2014/0142785 A1 | 5/2014 | Fuentes et al. | |
| 2014/0244097 A1 | 8/2014 | Colwell | |
| 2014/0303768 A1 | 10/2014 | Klumpp et al. | |
| 2014/0303814 A1 | 10/2014 | Burema et al. | |
| 2014/0308098 A1 | 10/2014 | Lert et al. | |
| 2014/0344118 A1 | 11/2014 | Parpia et al. | |
| 2014/0350725 A1 | 11/2014 | Lafary et al. | |
| 2014/0360832 A1 | 12/2014 | Aldrich | |
| 2014/0365258 A1 | 12/2014 | Vestal et al. | |
| 2014/0379205 A1* | 12/2014 | Muetzel | G07C 5/08 701/32.4 |
| 2015/0006005 A1 | 1/2015 | Yu et al. | |
| 2015/0091507 A1 | 4/2015 | Hyde et al. | |
| 2015/0100504 A1 | 4/2015 | Binion et al. | |
| 2015/0148951 A1 | 5/2015 | Jeon et al. | |
| 2015/0161830 A1* | 6/2015 | Lenhardt | G01N 27/048 701/30.5 |
| 2015/0224891 A1 | 8/2015 | Petrosian et al. | |
| 2015/0339928 A1 | 11/2015 | Ramanujam | |
| 2015/0360865 A1 | 12/2015 | Massey | |
| 2016/0063435 A1 | 3/2016 | Shah et al. | |
| 2016/0093119 A1* | 3/2016 | Ahn | G06Q 10/20 701/29.3 |
| 2016/0121487 A1 | 5/2016 | Mohan et al. | |
| 2016/0236867 A1 | 8/2016 | Brazeau et al. | |
| 2016/0342915 A1 | 11/2016 | Humphrey | |
| 2017/0092131 A1 | 3/2017 | Fairfield et al. | |
| 2017/0123421 A1 | 5/2017 | Kentley et al. | |
| 2017/0123428 A1* | 5/2017 | Levinson | G05D 1/0257 |
| 2017/0124781 A1* | 5/2017 | Douillard | G01S 17/931 |
| 2017/0263120 A1* | 9/2017 | Durie, Jr. | G08G 1/205 |
| 2017/0300054 A1 | 10/2017 | Hanson et al. | |
| 2018/0013211 A1 | 1/2018 | Ricci | |
| 2018/0114383 A1* | 4/2018 | Boss | G07C 5/0816 |
| 2018/0143649 A1 | 5/2018 | Miao et al. | |
| 2018/0164825 A1* | 6/2018 | Matus | B60W 50/0098 |
| 2018/0204398 A1* | 7/2018 | Smith | G07C 5/0808 |
| 2018/0247207 A1 | 8/2018 | Ristovski et al. | |
| 2018/0313282 A1 | 11/2018 | Pati et al. | |
| 2018/0342113 A1* | 11/2018 | Kislovskiy | G07C 5/008 |
| 2019/0005748 A1* | 1/2019 | Boss | G07C 5/0816 |
| 2019/0012198 A1 | 1/2019 | Ni et al. | |
| 2019/0061619 A1* | 2/2019 | Reymann | B60Q 9/00 |
| 2019/0064810 A1* | 2/2019 | Jiang | G06F 18/217 |
| 2019/0180527 A1* | 6/2019 | Segal | G06N 20/00 |
| 2019/0196480 A1 | 6/2019 | Taylor | |
| 2019/0197798 A1* | 6/2019 | Abari | G06N 5/04 |
| 2019/0220011 A1 | 7/2019 | Della Penna | |
| 2019/0225233 A1* | 7/2019 | Tod | G06Q 10/04 |
| 2020/0143610 A1* | 5/2020 | Boss | G07C 5/008 |
| 2020/0167722 A1 | 5/2020 | Goldberg | |
| 2020/0174493 A1 | 6/2020 | Lin et al. | |
| 2020/0294401 A1* | 9/2020 | Kerecsen | G05D 1/0287 |
| 2020/0348662 A1* | 11/2020 | Cella | G05B 19/0426 |
| 2020/0361480 A1* | 11/2020 | Rodriguez Bravo | B60W 60/0015 |

(56) References Cited

U.S. PATENT DOCUMENTS

2021/0012592 A1*  1/2021  Abari ..................... G06N 5/04
2021/0064057 A1   3/2021  Eldar et al.
2021/0157312 A1*  5/2021  Cella ..................... G06N 3/02

OTHER PUBLICATIONS

International Preliminary Report on Patentability of the ISA, dated Aug. 6, 2020 re PCT International Application No. PCT/CA2019/050077. (6 pages).

* cited by examiner

SYSTEMS AND METHODS FOR MAINTAINING VEHICLE STATE INFORMATION

CROSS-REFERENCE TO RELATED APPLICATIONS

This application is a continuation of U.S. patent application Ser. No. 16/253,308, filed 22 Jan. 2019, and titled "SYSTEMS AND METHODS FOR MAINTAINING VEHICLE STATE INFORMATION", which claims priority to U.S. Provisional Patent Application No. 62/621,519, filed 24 Jan. 2018, and titled "SYSTEMS AND METHODS FOR MONITORING FLEETS OF SELF-DRIVING INDUSTRIAL VEHICLES", the contents of which are incorporated herein by reference for all purposes.

TECHNICAL FIELD

The described embodiments relate to fleets of self-driving vehicles, and in particular, to systems and methods for maintaining vehicle state information.

BACKGROUND

The following paragraphs are not an admission that anything discussed in them is prior art or part of the knowledge of persons skilled in the art.

The introduction of automated and autonomous systems in the performance of industrial and manufacturing process has the potential to provide overall increases in productivity. However, the new technology of automated and autonomous systems may also introduce new problems in the performance of the industrial or manufacturing processes. As automated and autonomous systems become more complex and include more subsystems, components, and software, the number of failure points in the system increases. Since the intention of these systems is to increase productivity over previous technology, it is important to understand when errors or failures of these systems may be contributing to decreases in productivity.

SUMMARY

In a first aspect, there is a method for monitoring a fleet of self-driving vehicles. The method comprises autonomously navigating a self-driving vehicle in an environment, collecting current state information using a sensor of the vehicle, comparing the current state information with reference data, identifying outlier data in the current state information, and generating an alert based on the outlier data.

According to some embodiments, the method further comprises transmitting a notification to one or more monitoring devices based on the alert.

According to some embodiments, the method further comprises determining an escalation level based on the outlier data and identifying one or more user roles based on the escalation level. Transmitting the notification to the one or more monitoring devices comprises addressing the one or more monitoring devices based on the one or more user roles.

According to some embodiments, the current state information consists of current vehicle state information pertaining to the vehicle, the reference data comprises reference vehicle data, and the sensor is a vehicle sensor.

According to some embodiments, the method further comprises collecting current environment state information pertaining to the environment, and comparing the current environment state information with reference environment data. Identifying outlier data comprises identifying outlier data in at least one of the current vehicle state information based on the reference vehicle data and the current environment state information based on the reference environment data.

According to some embodiments, the current state information consists of current environment state information pertaining to the environment, the reference data comprises reference environment data, and the sensor is an environment sensor.

According to some embodiments, the method further comprises recording the alert in an alert log on a non-transitory computer-readable medium.

According to some embodiments, identifying the outlier data comprises calculating an anomaly within the current state information based on the reference data using one or more processors, transmitting a verification message to at least one first monitoring device based on the anomaly, receiving a verification confirmation from the at least one first monitoring device, and determining the outlier data based on the anomaly and the verification confirmation.

According to some embodiments, the method further comprises, prior to collecting the current state information, collecting preliminary state information using the sensor, comparing the preliminary state information with the reference data, determining that the preliminary state information does not comprise preliminary outlier data, and updating the reference data based on the preliminary state information.

In a second aspect, there is a system for monitoring a fleet of self-driving vehicles. The system comprises one or more self-driving vehicles having at least one sensor for collecting current state information, a fleet-management system in communication with the one or more self-driving vehicles, and non-transient computer-readable media for storing reference data in communication with the fleet-management system. The self-driving vehicle is configured to collect the current state information and transmit the current state information to the fleet-management system. The fleet-management system is configured to receive the reference data from the media, receive the current state information from the vehicle, compare the current state information with the reference date, identify outlier data in the current state information, and generate an alert based on the outlier data.

According to some embodiments, the system further comprises one or more monitoring devices in communication with the fleet-management system. The fleet-management system is further configured to transmit a notification to the one or more monitoring devices based on the alert.

According to some embodiments, the fleet-management system is further configured to determine an escalation level based on the outlier data, identify one or more user roles based on the escalation level, and select one or more pertinent monitoring devices from the one or more monitoring devices based on the one or more user roles. The fleet-management system configured to transmit the notification to the one or more monitoring devices based on the alert comprises the fleet-management system configured to transmit the notification to the one or more pertinent monitoring devices.

According to some embodiments, the current state information consists of current vehicle state information pertaining to the vehicle, the reference data comprises reference vehicle data, and the sensor comprises a vehicle sensor.

According to some embodiments, the sensor further comprises an environment sensor, and the reference data further comprises reference environment data. The vehicle is further configured to collect current environment state information pertaining to the environment using the environment sensor. The fleet-management system is further configured to compare the current environment state information with the reference environment data. The fleet-management system configured to identify the outlier data comprises the fleet-management system configured to identify the outlier data in at least one of the current vehicle state information based on the reference vehicle data and the current environment state information based on the reference environment data.

According to some embodiments, the current state information consists of current environment state information pertaining to the environment, the reference data comprises reference environment data, and the sensor is an environment sensor.

According to some embodiments, the fleet-management system is further configured to record the alert in an alert log on the media.

According to some embodiments, the fleet-management system configured to identify the outlier data further comprises the fleet-management system configured to calculate an anomaly within the current state information based on the reference data, transmit a verification message to at least one first monitoring device selected from the one or more monitoring devices based on the anomaly, receive a verification confirmation from the at least one first monitoring device, and determine the outlier data based on the anomaly and the verification confirmation.

According to some embodiments, the vehicle is configured to collect preliminary state information using the sensor prior to collecting the stating information. The fleet-management system is configured to compare the preliminary state information with the reference data, determine that the preliminary state information does not comprise preliminary outlier data, and update the reference data on the media based on the preliminary state information.

In a third aspect, there is a method for monitoring a fleet of self-driving vehicles. The method comprises transmitting a respective mission to at least one vehicle of the fleet using a fleet-management system, executing the respective mission by autonomously navigating the at least one vehicle according to the respective mission, collecting current state information from the at least one vehicle based on the executing the respective mission, determining current fleet-performance metric information based on the current state information, comparing the current fleet-performance metric information with reference data, identifying outlier data in the current fleet-performance metric information, and generating an alert based on the outlier data.

According to some embodiments, the method further comprises transmitting a notification to one or more monitoring devices based on the alert.

According to some embodiments, the method further comprises determining an escalation level based on the outlier data and identifying one or more user roles based on the escalation level. Transmitting the notification to the one or more monitoring devices comprises addressing the one or more monitoring devices based on the one or more user roles.

According to some embodiments, identifying the outlier data comprises calculating an anomaly within the current state information based on the reference data using one or more processors, transmitting a verification message to at least one first monitoring device based on the anomaly, receiving a verification confirmation from the at least one first monitoring device, and determining the outlier data based on the anomaly and the verification confirmation.

According to some embodiments, the method further comprises, prior to transmitting the respective mission to the at least one vehicle, transmitting a respective preliminary mission to the at least one vehicle of the fleet using the fleet-management system, executing the respective preliminary mission, collective preliminary state information from the at least one vehicle based on the executing the respective preliminary mission, determining preliminary fleet-performance metric information based on the preliminary state information, comparing the preliminary fleet-performance metric information with the reference data, determining that the preliminary fleet-performance metric information does not comprise preliminary outlier data, and updating the reference data based on the preliminary fleet-performance metric information.

In a fourth aspect, there are non-transitory computer-readable media comprising one or more instructions for monitoring a fleet of self-driving vehicles that, when executed on a processor, configure the processor to receive current state information from one or more vehicles that are members of the fleet of self-driving vehicles, receive reference data stored on the media, compare the current state information with the reference data, identify outlier data in the current state information, generate an alert based on the outlier data, determine an escalation level based on the outlier data, identify one or more user roles based on the escalation level, select one or more pertinent monitoring devices from one or more monitoring devices based on the one or more user roles, and transmit a notification to the one or more pertinent monitoring devices based on the alert.

BRIEF DESCRIPTION OF THE DRAWINGS

Several embodiments will now be described in detail with reference to the drawings, in which.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Self-driving industrial vehicles and systems can be used not only to transport materials without constant direct human operation, but also to monitor themselves and their performance, thereby providing deeper insights into vehicle status, vehicle performance, fleet status, and fleet performance as compared to traditional material-transport vehicles. These statuses and performance metrics can be used to generate notifications, and to escalate the notifications to appropriate human decision-makers in real time.

Figure 1:
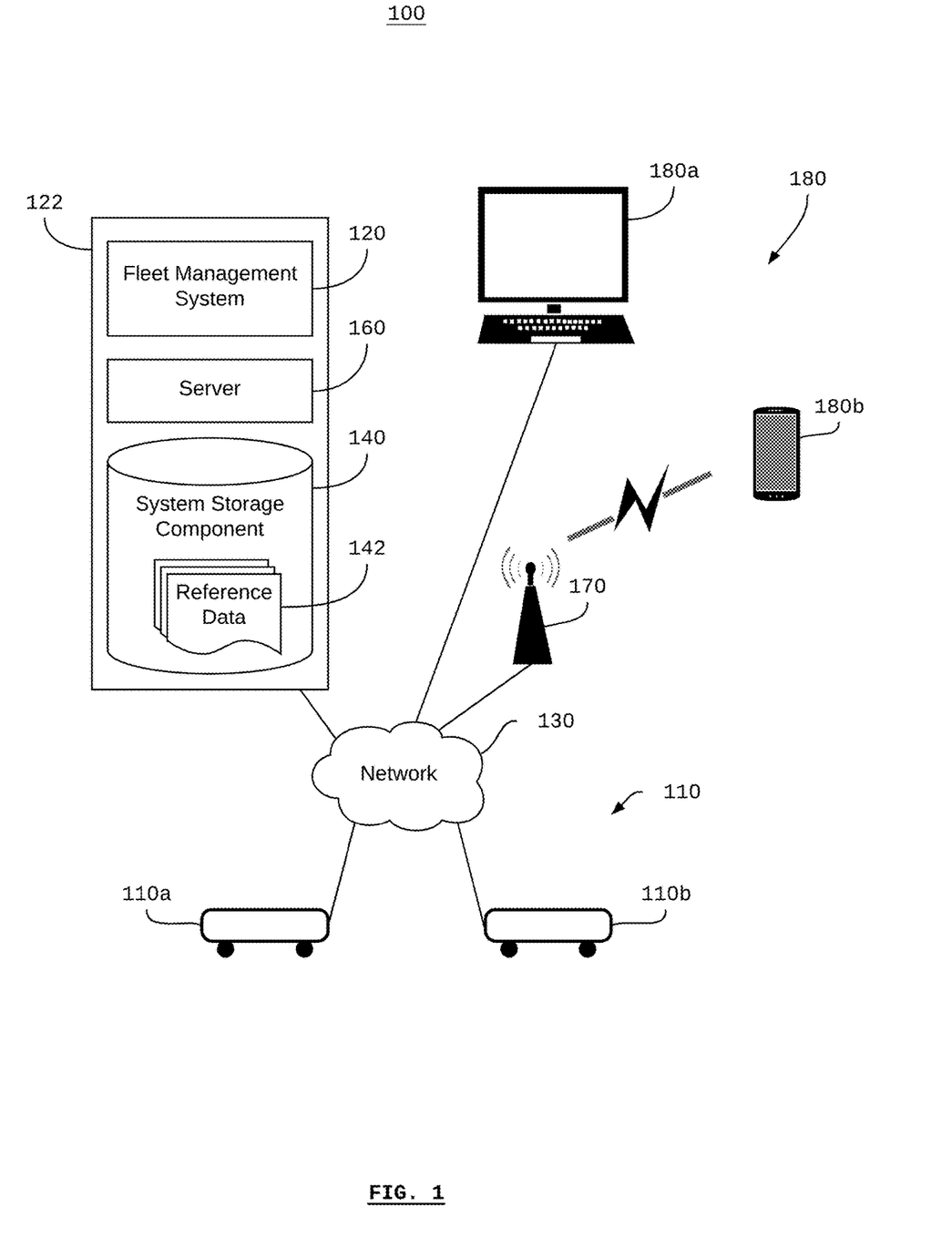
FIG. 1 is a system diagram of a system for maintaining vehicle state information according to at least one embodiments.

Referring to FIG. 1, there is shown a system 100 of one or more self-driving industrial vehicles 110, according to at least one embodiment. The system 100 can include one or more self-driving industrial vehicles 110, a fleet-management system 120, a network 130, a system storage component 140, a server 160, and one or more monitoring devices 180. While FIG. 1 shows the system 100 having two self-driving industrial vehicles 110a and 110b for illustrative purposes. The system 100 can include one or more self-driving industrial vehicles 110.

According to some embodiments, a fleet-management system 120 may be used to provide a mission to a self-driving industrial vehicle 110. The fleet-management system 120 has a processor, memory, and a communication interface (not shown) for communicating with the network 130. The fleet-management system 120 uses the memory to store computer programs that are executable by the processor (e.g. using the memory) so that the fleet-management system 120 can communicate information with other systems, and communicate with one or more self-driving industrial vehicles 110. In some embodiments, the fleet-management system 120 can also generate missions for the self-driving industrial vehicles 110.

Any or all of the self-driving industrial vehicles 110 and the fleet-management system 120 may communicate with the network 130 using known telecommunications protocols and methods. For example, each self-driving industrial vehicle 110 and the fleet-management system 120 may be equipped with a wireless communication interface to enable wireless communications within a LAN according to a WiFi protocol (e.g. IEEE 802.11 protocol or similar), or via a WWAN according to a 3G/4G protocol.

According to some embodiments, the system storage component 140 can store information about the self-driving industrial vehicles 110 as well as electronic maps of the facilities within which the self-driving industrial vehicles 110 operate. The information about the self-driving industrial vehicles 110, their environments, and the performance of the fleet may generally be stored as reference data 142 on the system storage component 140, as further described below.

According to some embodiments, and as indicated by the box 122 in FIG. 1, the fleet-management system 120, the system storage component 140, and the server 160 may be implemented in the same computing device that is in communication with the network 130. Similarly, according to some embodiments, any one or two of the fleet-management system 120, the system storage component 140, and the server 160 may be implemented using a unique computing device in communication with the network 130. For simplicity and illustration, the fleet-management system 120, the system storage component 140, and the server 160 are shown as individual components within the system 122.

Generally, the server can be used to provide reports of vehicle status, vehicle performance, fleet status, and fleet performance based on the vehicle status logs 142, and/or to record reference data 142 based on vehicle state information and/or environmental state information collected by the vehicles 110. Further, the server 160 may be configured to identify and verify outliers in vehicle state information, environmental state information, and/or fleet-performance metrics, and to generate a notification based on the outliers. The server 160 has a processor, memory, and may have a communication interface (not shown) for communicating with the network 130. The server 160 uses the memory to store computer programs that are executable by the processor (e.g. using the memory) so that the server 160 can communicate information with other systems, such as the fleet-management system 120 and/or the vehicles 110. According to some embodiments, the processor, memory, and communication interface may be shared with (or shared from) the fleet-management system; in other words, implemented on the same computing device as the fleet-management system.

The system 100 may include one or more monitoring devices 180. Generally, the monitoring devices 180 have a processor, memory, and communications interface (not shown) are in communication with the network 130. Monitoring devices may be desktop computer terminals, laptop computers, mobile devices such as mobile phone, smart phone, tablets, and smart watches, display-walls and display-wall controllers, virtual and augmented reality displays, and other similar devices. The communications interfaces may be used for wired and/or wireless communications, for example, with the network 130.

As shown in the example of FIG. 1, a first monitoring device 180a may be a computer workstation, and a second monitoring device 180b may be a mobile device such as a mobile phone, smart phone, or tablet. The computer workstation 180a is shown to have a wired connection with the network 130, and the mobile device 180b is shown to have a wireless connection with the network 130 via a wireless transceiver 170. While FIG. 1 shows the system 100 having two monitoring devices 180a and 180b for illustrative purposes. The system 100 can include one or more monitoring devices 180.

Figure 2:
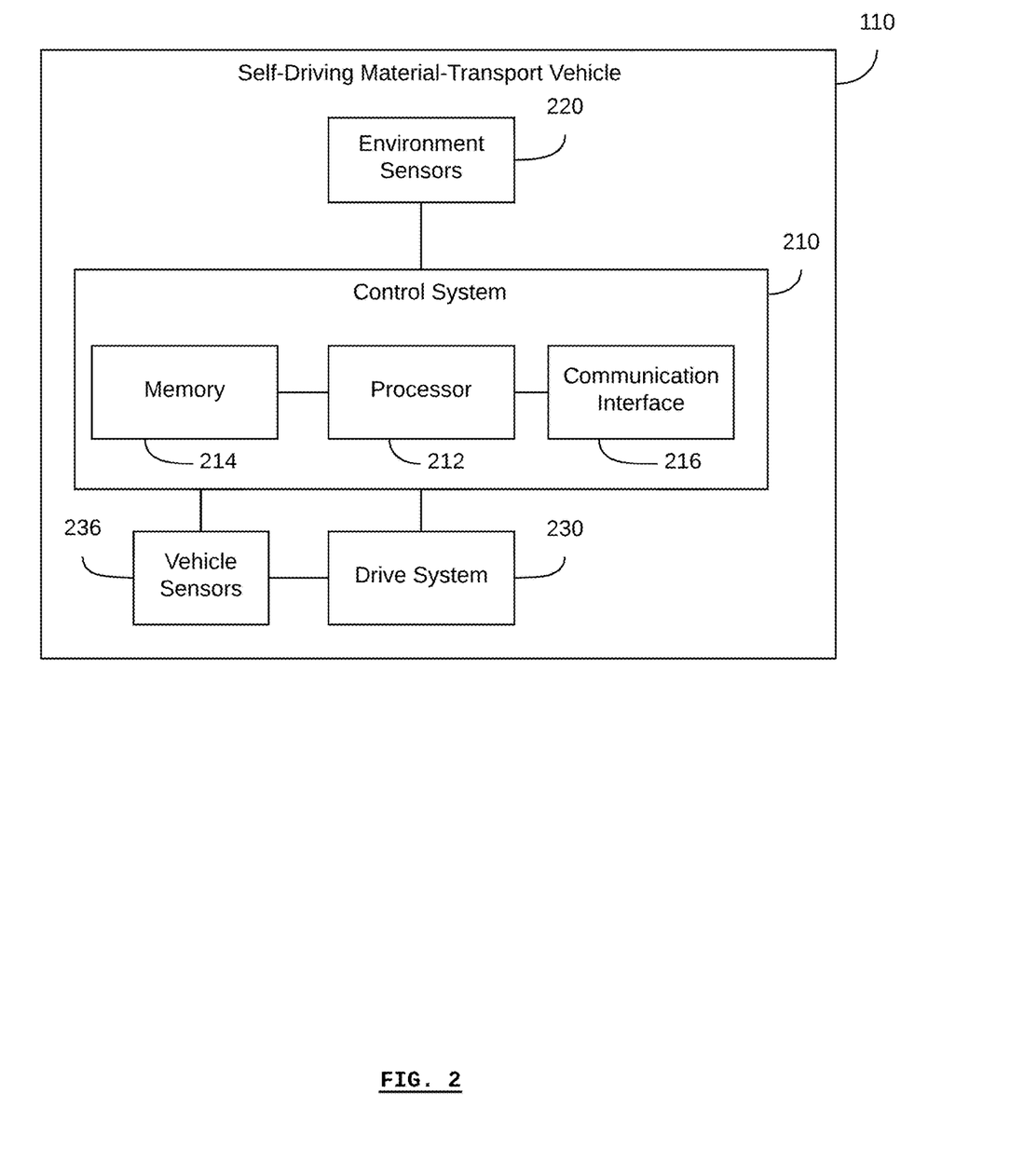
FIG. 2 is a block diagram of a self-driving vehicle in the system shown in FIG. 1, according to at least one embodiment.

Referring to FIG. 2, there is shown a block diagram of a self-driving industrial vehicle 110, according to at least one embodiment. The self-driving industrial vehicle 110 generally includes a control system 210, at least one environment sensor 220, a drive system 230, and at least one vehicle sensor 236.

The control system 210 can include a processor 212, memory 214, and a communication interface 216. The control system 210 enables the self-driving industrial vehicle 110 to operate automatically and/or autonomously. The control system 210 can store an electronic map that represents the environment of the self-driving industrial vehicle 110, such as a facility, in the memory 214.

According to some embodiments, the communication interface 216 can be a wireless transceiver for communicating with a wireless communications network (e.g. using an IEEE 802.11 protocol, a 3G/4G protocol or similar).

One or more environment sensors 220 may be included in the self-driving industrial vehicle 110 to obtain data about the environment of the self-driving industrial vehicle 110. These environment sensors 220 can be distinguished from other sensors 236. For example, according to some embodiments, an environment sensor 220 may be a LiDAR device (or other optical, sonar, or radar-based range-finding devices known in the art). An environment sensor 220 may comprise optical sensors, such as video cameras and systems (e.g., stereo vision, structured light). Other examples of environment sensors include humidity sensors for measuring the ambient humidity in the facility, thermal sensors for measuring the ambient temperature in the facility, and microphones for detecting sounds.

According to some embodiments, the self-driving industrial vehicle 110 may receive a mission from a fleet-management system 120 or other external computer system in communication with the self-driving industrial vehicle 110 (e.g. in communication via the communication interface 216). In this case, the mission contains one or more waypoints or destination locations. Based on the waypoint or destination location contained in the mission, the self-driving industrial vehicle 110, based on the control system 210, can autonomously navigate to the waypoint or destination location without receiving any other instructions from an external system. For example, the control system 210, along with the sensors 220, enable the self-driving industrial vehicle 110 to navigate without any additional navigational aids such as navigational targets, magnetic strips, or paint/tape traces installed in the environment in order to guide the self-driving industrial vehicle 110.

For example, the control system 210 may plan a path for the self-driving industrial vehicle 110 based on a destination location and the location of the self-driving industrial vehicle 110. Based on the planned path, the control system 210 may control the drive system 230 to direct the self-driving industrial vehicle 110 along the planned path. As the self-driving industrial vehicle 110 is driven along the planned path, the environmental sensors 220 may update the control system 210 with new images of the environment of the self-driving industrial vehicle 100, thereby tracking the progress of the self-driving industrial vehicle 110 along the planned path and updating the location of the self-driving industrial vehicle 110.

Since the control system 210 receives updated images of the environment of the self-driving industrial vehicle 110, and since the control system 210 is able to autonomously plan the self-driving industrial vehicle's path and control the drive system 230, the control system 210 is able to determine when there is an obstacle in the self-driving industrial vehicle's path, plan a new path around the obstacle, and then drive the self-driving industrial vehicle 110 around the obstacle according to the new path.

The self-driving industrial vehicle 110 may also comprise one or more vehicle sensors 236. These vehicle sensors generally measure and monitor the state of the vehicle 110 itself, as compared to the environment sensors 220, which sense the vehicle's environment. The vehicle sensors 236 may be associated with particular components of the vehicle 110. For example, the vehicle sensors 236 may be current and/or voltage sensors for measuring the current and/or voltage of a particular electrical component, or for determining an approximate state of battery charge. The vehicle sensors 236 may be encoders for measuring the displacement, velocity, and/or acceleration (e.g. angular displacement, angular velocity, angular acceleration) of mechanical components such as motors, wheels, and shafts. The vehicle sensors 236 may be thermal sensors for measuring heat, for example, the heat of a motor or brake. The vehicle sensors 236 may be inertial measurement units for measuring motion of the body of the vehicle 110 (e.g. the vehicle sensors 236 may comprising accelerometers, gyroscopes, etc.). The vehicle sensors 236 may be water ingress sensors for detecting water within the body of the vehicle 110.

According to some embodiments, vehicle state information may not be limited to only the information derived from the vehicle sensors 236. For example, vehicle state information may also pertain to the mission that the vehicle is executing, the status of the mission, and other operational parameters known to the control system 210 independent of input from the vehicle sensors 236.

For simplicity and clarity of illustration, the example shown in FIG. 2 shows a single block labelled "environment sensors" 220 and a single block labelled "vehicle sensors" 236, each in communication with the control system 210. According to some embodiments, there may be any number of environment sensors 220 and/or vehicle sensors 232, which may or may not all be in communication with the drive system 230, depending on the nature of the particular environment sensors and vehicle sensors 236. In this example, the vehicle sensors 236 are shown in communication with the drive system 230 in order to measure characteristics of the drive system 230, for example, motor speed, motor temperature, etc.

The vehicle environment sensors 220 are generally in communication with the control system 210 so that the control system 210 can received the measurements from the environment sensors, for example, in order to determine or provide environment state information. Similarly, the vehicle sensors 236 are generally in communication with the control system 210 so that the control system 210 can received the measurements from the vehicle sensors, for example, in order to determine or provide vehicle state information.

The positions of the components 210, 212, 214, 216, 220, 230, and 236 of the self-driving industrial vehicle 110 are shown for illustrative purposes and are not limited to the positions shown. Other configurations of the components 210, 212, 214, 216, 220, 230, and 236 are possible.

Figure 3:
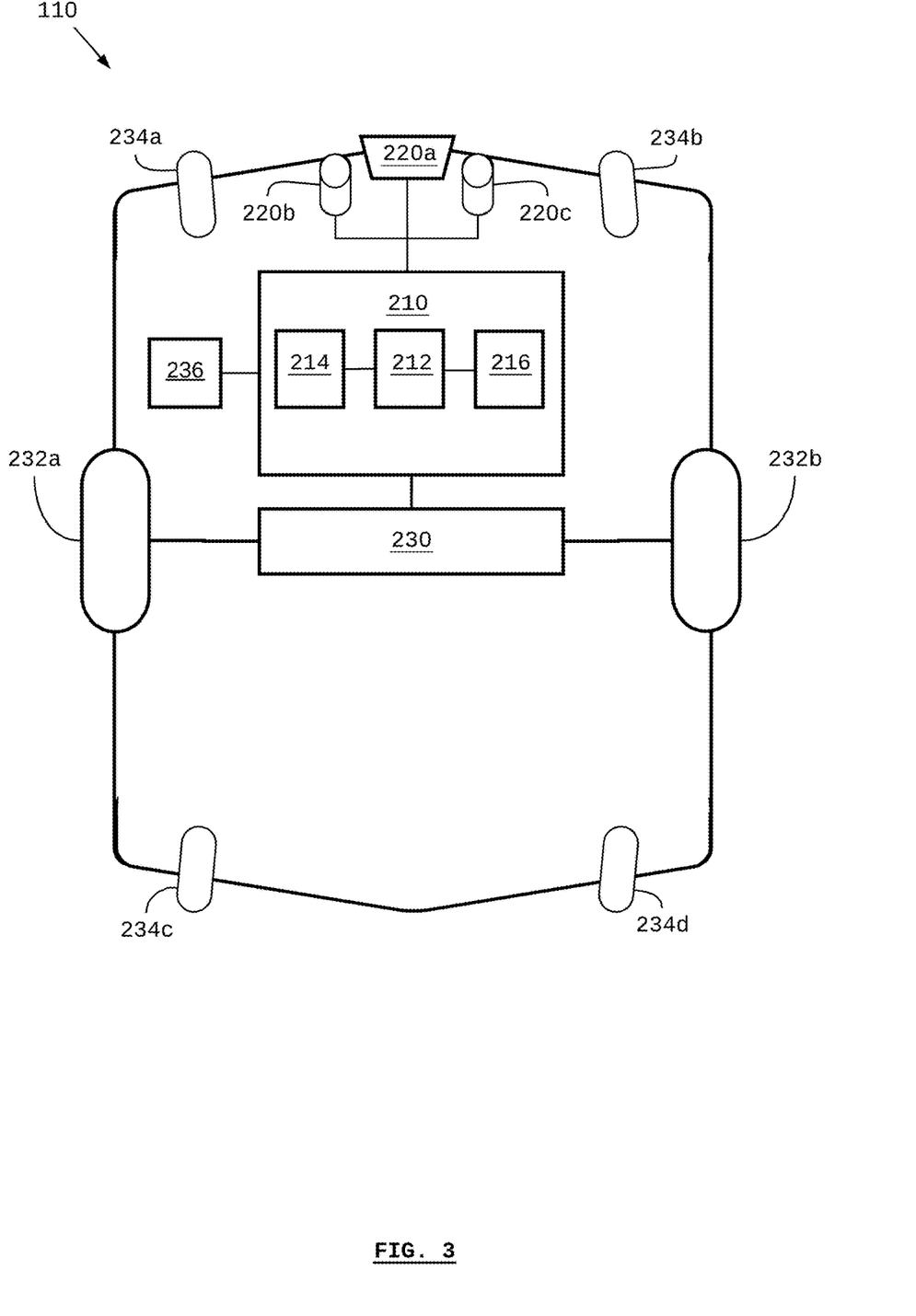
FIG. 3 is a block diagram of a self-driving vehicle in the system shown in FIG. 1, according to at least one embodiment.

Referring to FIG. 3, there is shown a block diagram of a self-driving industrial vehicle 110, according to at least one embodiment. The drive system 230 includes a motor and/or brakes connected to drive wheels 232a and 232b for driving the self-driving industrial vehicle 110. According to some embodiments, the motor may be an electric motor, a combustion engine, or a combination/hybrid thereof. According to some embodiments, there may be one motor per drive wheel, for example, one for drive wheel 232a and one for drive wheel 232b. Depending on the particular embodiment, the drive system 230 may also include control interfaces that can be used for controlling the drive system 230. For example, the drive system 230 may be controlled to drive the drive wheel 232a at a different speed than the drive wheel 232b in order to turn the self-driving industrial vehicle 110. Different embodiments may use different numbers of drive wheels, such as two, three, four, etc.

According to some embodiments, additional wheels 234 may be included (as shown in FIG. 3, the wheels 234a, 234b, 234c, and 234d may be collectively referred to as the wheels 234). Any or all of the additional wheels 234 may be wheels that are capable of allowing the self-driving industrial vehicle 110 to turn, such as castors, omni-directional wheels, and mecanum wheels.

According to some embodiments, the environment sensors 220 (as shown in FIG. 3, the sensors 220a, 220b, and 220c may be collectively referred to as the environment sensors 220) may be optical sensors arranged in a manner to provide three-dimensional (e.g. binocular or RGB-D) imaging.

The vehicle 110 may also include one or more vehicle sensors 236, as previously described in respect of FIG. 2.

The positions of the components 210, 212, 214, 216, 220, 230, 232, 234, and 236 of the self-driving industrial vehicle 110 are shown for illustrative purposes and are not limited to the shown positions. Other configurations of the components 210, 212, 214, 216, 220, 230, 232, 234, and 236 are possible.

Generally, one or more vehicles 110 may comprise a fleet of vehicles that operates within an industrial facility. As a vehicle is operating (or is unable to operate) within the facility, the vehicle may experience one or more states or conditions. These states and conditions can be reflected in one or both of vehicle state information and environment state information.

As used herein, "vehicle state information" refers to information indicative of the state of a vehicle, for example, as determined by the vehicle sensors 236. Non-limiting examples of vehicle state include "active", "inactive", "working", "idle", "emergency stop", "safety stop", and "vehicle malfunction/error". Vehicle state information can also include detailed information such as whether a vehicle is on a mission or queued for a mission, and what the nature of the mission is. Furthermore, Vehicle state information can include detailed information such as a particular type of error or malfunction that the vehicle is experiencing, and the particular components and subsystems that are failing or experiencing an error or malfunction. Further descriptions of vehicle state information are provided in Patent Application No. 62/620,184 entitled "Systems and Methods for Measuring Fleets of Self-driving Industrial Vehicles" and filed on 22 Jan. 2018, which is hereby incorporated by reference in its entirety.

As used herein, "environment state information" refers to information indicative of the state of the environment experienced by the vehicle, for example, as determined by the environment sensors 220. The environment experienced by the vehicle may be an indoor industrial facility. According to some embodiment, the environment experienced by the vehicle may be an outdoor facility, a public or private roadway, or an off-road environment. Non-limiting examples of environment state information include temperature, humidity, sound, electro-magnetic signals (e.g. wireless communications signals such as WiFi) and atmospheric conditions such as the presence or concentration of particular chemical substances (e.g. chemicals used in or by-products of a particular process). Environment state information can also include the presence or absence of objects with respect to a particular location, such as objects detected by environment sensors such as LiDARs and vision systems.

As used herein, "fleet-performance metric information" refers to information indicative of the state of the fleet of vehicles, for example, as determined by aggregate vehicle state information collected by multiple vehicles within the fleet. According to some embodiments, the fleet of vehicles may generally be used in the execution of an industrial or manufacturing process being conducted within the facility. Generally, a stage or step in the process may be associated with a vehicle mission. As such, vehicle state information, such as information pertaining to a mission, the execution of a mission, the time taken to execute a mission, etc., may be used to calculate performance metrics of the fleet. Examples of fleet-performance metrics include, but are not limited to: takt times, mean-time before interruption (for vehicle failure within the fleet), system availability (e.g. percentage of time for which the fleet is unable to supply the necessary vehicles to the process due to system or vehicle error), the number of production cycles run in a unit of time, mission durations, etc.

The vehicle 110 described in FIG. 2 and FIG. 3 is provided as an example and in reference to some embodiments. However, the systems and methods contemplated herein may also be embodied with other types of vehicles. Such vehicles are not limited to being self-driving vehicles, nor to being terrestrial vehicles. For example, vehicles used in indoor and/or outdoor industrial facilities and environments may be used. Vehicles on public roadways may be used. Aerial vehicles, such as autonomous aerial vehicles may be used. Aquatic vehicles such as autonomous or automated boats may be used. According to some embodiments, the vehicles need not be autonomous, or enabled with any particular degree of automation.

Figure 4:
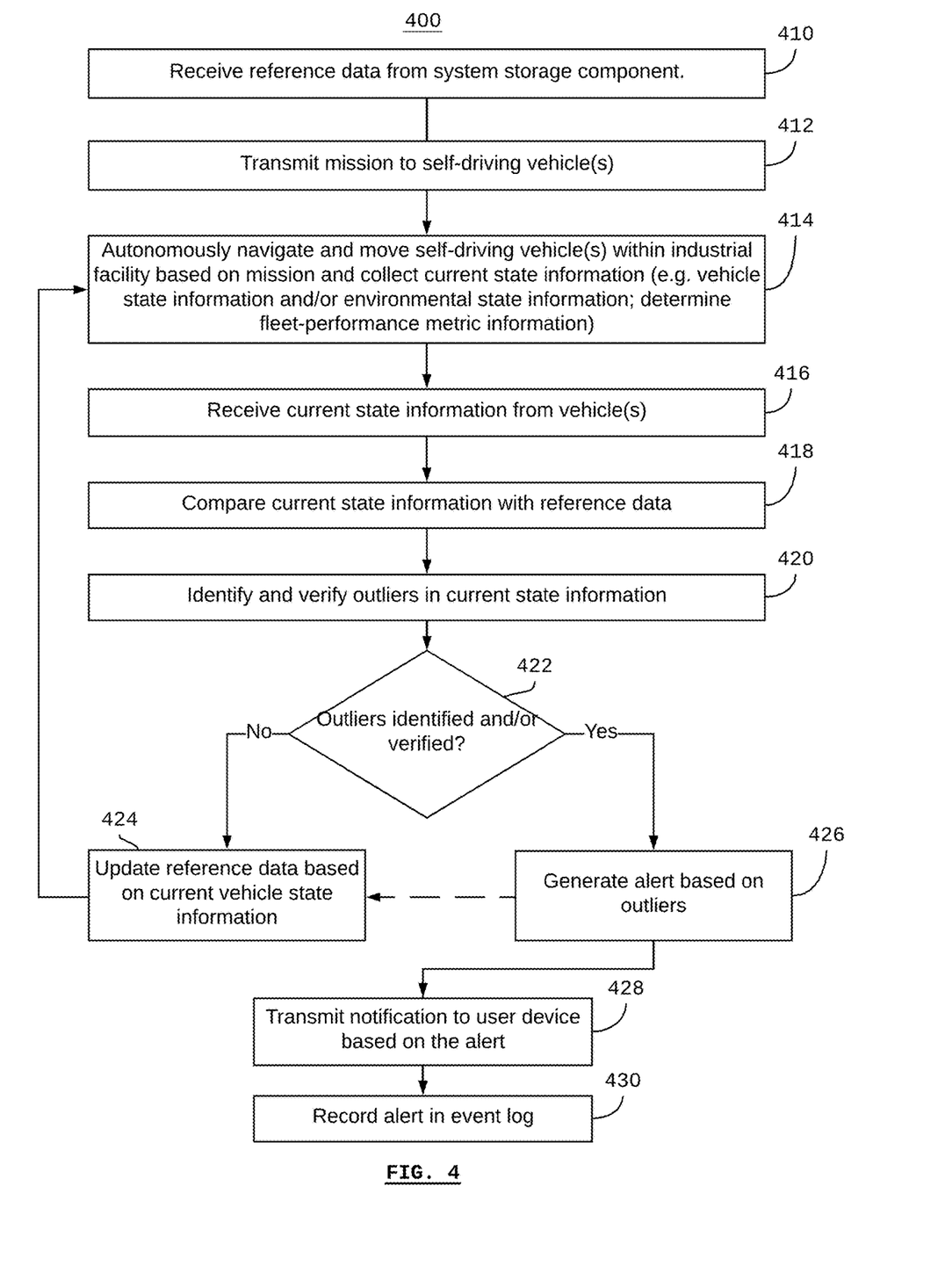
FIG. 4 is a block diagram of a method for maintaining vehicle state information according to at least one embodiment.

Referring to FIG. 4, there is a method 400 for monitoring a fleet of self-driving vehicles. According to some embodiments, all or parts of the method 400 may be executed by a server such as the server 160 or by a fleet-management system such as the fleet-management system 120. According to some embodiments, all or parts of the method 400 may be executed using a system storage component such as the system storage component 140, and one or more vehicles such as the fleet of vehicles 110.

According to some embodiments, a single computer system may be used to implement any or all of the fleet-management system, the server, and the system storage component. In such a case, the single system, for example the system 122 in FIG. 1 may be referred to as the "fleet-management system" or the "server".

The method 400 may be run on a per-vehicle basis, or on a per-fleet basis (that is, with multiple vehicles). For simplicity and illustration, the method 400 may be described in respect of a single vehicle. However, the method 400 may be run concurrently with or on a fleet of vehicles.

The method 400 may begin at step 410 when reference data is received from a system storage component, such as the system storage component 140.

Generally, the method 400 may be executed using any or all of a vehicle (e.g. the vehicle's control system), a fleet-management system, a server, and a system storage component. For example, in some cases, the method 400 may be executed primarily by the vehicle itself. In this case, at step 410, the vehicle may receive the reference data from the system storage component, and store some or all of the reference data as "local" reference data (i.e. "locally" stored on the vehicle) on non-transient computer-readable media on the vehicle.

According to some embodiments, the method 400 may be executed by a fleet-management system and/or server. In this case, at step 410, the fleet-management system or server may receive the reference data from the system storage component. According to some embodiments, the fleet-management system or server may cache the reference data.

The reference data may be received according to a predefined schedule, as the result of a particular type of event, and/or in response to a request made by a vehicle and/or fleet-management system or server. For example, the vehicle may receive periodic updates of the reference data from the system storage component, and update its local reference data (or a subset thereof) accordingly. The fleet-management system and/or server may receive periodic updates of the reference data from the system storage component, and update is reference data or cache accordingly.

According to some embodiments, the step 410 may be undertaken at any time prior to step 418. For example, the vehicle and/or fleet-management system or server may request the reference data from the system storage component according to a pre-determined schedule or in response to a particular type of event.

As used herein, "reference data" generally refers to a set of data that models or is based on previously-acquired state information such as vehicle state information, environment information, and fleet-performance metric information. For example, state information may have been previously acquired based on previous iterations of the method 400. State information may have been previously acquired based on the use of other similar vehicles or similar fleets of vehicles. State information may also be modeled or otherwise pre-determined. For example, expectations of normal operating parameters for the vehicle and the vehicle's subsystems and components may be used to generate reference data.

According to some embodiments, reference data may pertain to statistics that are based on previously-obtained (or modelled) state information. For example, for a particular set of state information, the average, mean, distribution, and deviations can be determined. The statistics derived based on previous state information may comprise the reference data.

At step 412, the fleet-management system or server, as the case may be, transmits a mission to a self-driving vehicle. According to some embodiments, the mission may include information such as a task to be performed by the vehicle and/or a location to which the vehicle is to travel. According to some embodiments, the mission does not include specific path-planning or routing information to the location, since the vehicle is capable of autonomous navigation and can plan its own paths in real time, for example, by navigating around detected object, known traffic patterns, and restricted or excluded zones within the facility.

The mission transmitted at step 412 is generally received by the self-driving vehicle, which is implicit in step 412.

According to some embodiments, the method 400 may be run using a fleet-management system or server and a fleet of vehicles. In this case, at step 412, missions may be transmitted from the fleet-management system or server to any or all of the vehicles in the fleet.

At step 414, the vehicle autonomously navigates and moves within the industrial facility based on the mission. As the vehicle is operating (or not operating, as the case may be, for example in the case of an error), the vehicle collects current state information. According to some embodiments, the current state information comprises any or all of current vehicle state information and current environment state information.

For example, with respect to vehicle information, as the vehicle is operating (or not operating), the vehicle may detect the state of its components, subsystems, and functionality based on information collected by vehicle sensors such as the vehicle sensors 236. According to some embodiments, the vehicle may also collect vehicle state information from its control system, such as the control system 210. For example, if the control system understands that the vehicle is currently successfully executing a mission, this information may be used to determine the current vehicle state information.

With respect to environment information, as the vehicle is operating (or not operating), the vehicle may collect environment state information with its environment sensors such as the environment sensors 220. For example, the vehicle may detect an object (e.g. dynamic objects such as humans and other moving vehicles and static objects such as equipment, shelves, walls, etc.) using its LiDAR and/or vision systems. The vehicle may collect ambient temperature information using a thermal sensor. The vehicle may detect a particular gas in the air within the facility.

Generally, the current state information may be stored in a memory and/or non-transient computer-readable medium on the vehicle. The current state information may also be transmitted to the fleet-management system and/or server. According to some embodiments, the current state information may be transmitted from the vehicle to the fleet-management system and/or server based on a pre-determined schedule (e.g. every second; every minute; etc.) or based on a particular event. For example, the current state information may be transmitted to the fleet-management system and/or server whenever the vehicle determines that the current state information has changed since the previous state information that was collected.

According to some embodiments, the method 400 may be executed using a fleet of two or more vehicles. In such a case, each of the steps 412 and 414 may be executed per vehicle, with the additional determination of fleet performance metric information based on the aggregate current state information collected from each vehicle at step 414.

At step 416, the current state information is received from the vehicle. According to some embodiments, the current state information may be received by the fleet-management system and/or server and then subsequently recorded on the system storage component by the fleet-management system and/or server. According to some embodiments, the current state information may be received by the system storage component directly from the vehicle. In some cases, for example if vehicle itself is executing step 418, step 416 may be redundant.

According to some embodiments, the fleet-management system and/or server may receive current state information from the vehicles(s) comprising current vehicle state information and/or current environment state information from one or more vehicles in a fleet, and the subsequently determine current fleet-performance metric information based on the aggregate information collected from the one or more vehicles in the fleet. This current fleet-performance metric information may be recorded on the system storage component.

According to some embodiments, the method 400 may be run using a fleet-management system or server and a fleet of vehicles. In this case, at step 416, the current state information from any or all of the vehicles in the fleet may be received.

At step 418, the current state information is compared with the reference data. According to some embodiments, comparing the current state information with the reference data may comprise selecting a particular statistic or statistics from within the reference data in order to compare with the current state information. For example, in a particular case, the current state information may be compared with reference data that represents an average or mean of previously state information. In another example, the current state information may be compared with the deviation, dispersion, or variation of the reference data.

At step 420, outliers, if any, in the current state information are identified. Generally, an "outlier" exists in the current state information based on non-conformance of the current state information with the reference data, for example, using pattern recognition. According to some embodiments, the existence of outliers may include the use of any or all techniques such as k-nearest neighbor algorithms, local outlier factor algorithms, density-based techniques, sub-space and correlation-based outlier detection, classification and regression analysis, support-vector machines, association rules, recurrent neural networks, and cluster analysis.

According to some embodiments, identifying an outlier within the current state information may involve verification by a human operator. For example, an anomaly may be identified based on non-conformance of the current state information with the reference data, as previously described. However, prior to the anomaly being deemed an "outlier", a human operator may be notified of the anomaly. For example, a vehicle, fleet-management system, and/or server may transmit a verification to a monitoring device such as a smart phone, mobile device, or wearable device. The human operator may attend to the vehicle associated with the anomaly, and inspect the vehicle and/or the vehicle's environment. If the human operator deems that the condition of the vehicle and/or environment is sufficiently problematic, the human operator may transmit a verification confirmation back to the vehicle, fleet-management system, and/or server. Based on the verification confirmation received from the monitoring device, an outlier may be determined to exist based in respect of the anomaly.

If, at step 420, no outlier was determined to exist, then, at step 422, the method proceeds to step 424. If, at step 420, an outlier was determined to exist, then the method proceeds to step 426.

Step 424 may be used in some embodiments in order to compile the current state information into the reference data. For example, the reference data may be updated by transmitting the current state information to the system storage component. According to some embodiments, statistical or other computations may be performed on the current state information in order to update the reference data.

Generally, the method returns to step 414 such that the vehicle continues to navigate and move autonomously, while collecting (new) current state information.

As used with respect to FIG. 4, "current" state information refers to the most-recent state information collect in respect of a particular iteration of the method 400. Similarly, state information collected in a previous iteration of the method 400 may be referred to as "preliminary" state information. As such, preliminary state information may be used to update the reference data at step 424, and on a subsequent iteration of the method 400, the reference data may be used to identify outliers in the current state information.

At step 426, an alert is generated based on the outliers. According to some embodiments, the alert may include any or all information pertaining to the identity of the vehicle associated with the outlier, the location of the vehicle, the nature of the outlier (e.g. "left motor overheated"), the process stages pertaining the fleet performance metric information, etc.

At step 428, a notification may be transmitted to one or more user devices based on the alert. According to some embodiments, step 428 may include any or all steps of the method 500 as described in respect of FIG. 5.

At step 430 the alert (or a record pertaining to the alert) may be stored in an event log. According to some embodiments, the event log may be recorded on non-transitory computer-readable media, for example, as a part of the fleet-management system, server, system storage component, or the vehicle.

Figure 5:
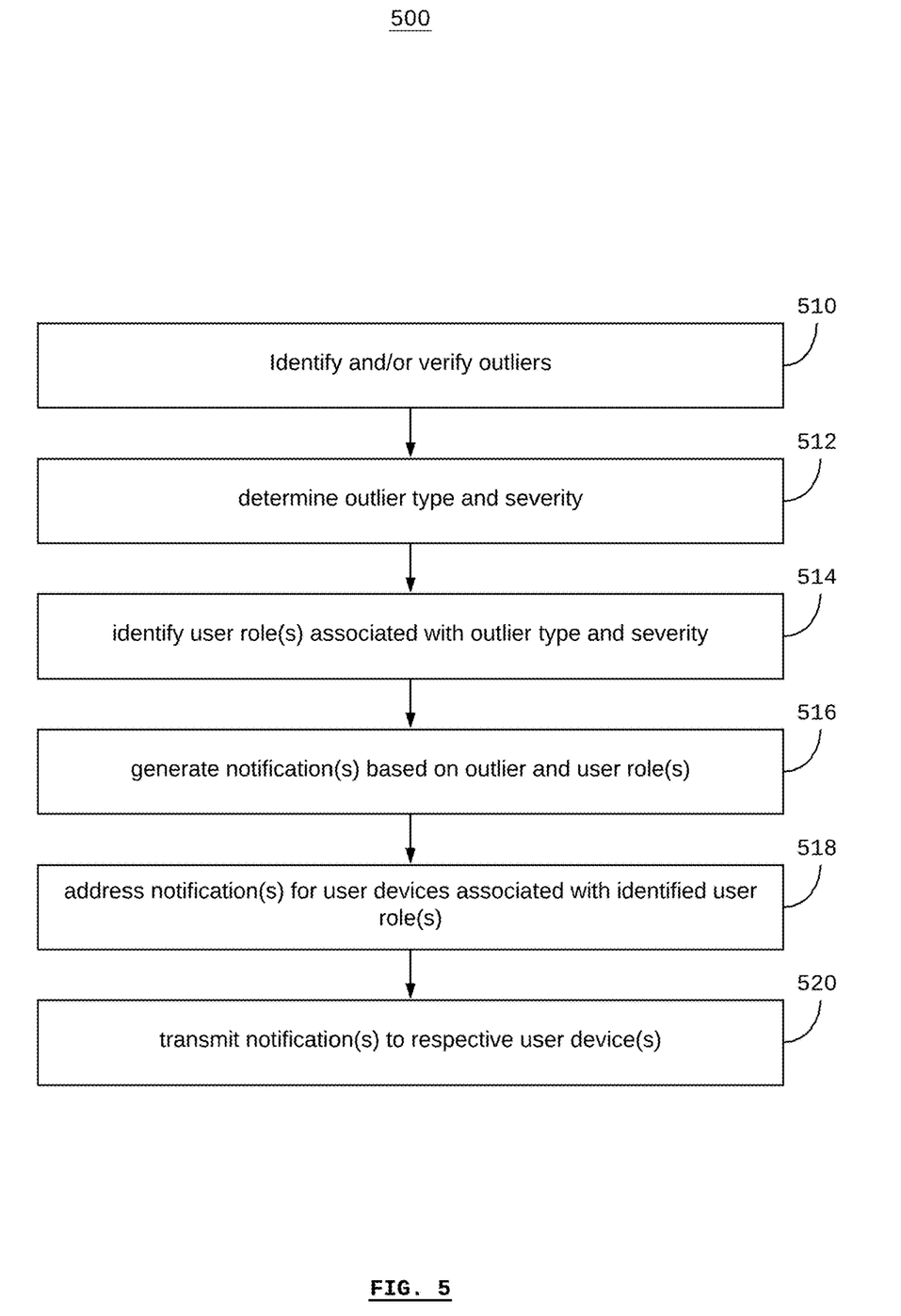
FIG. 5 is a block diagram of a method for maintaining vehicle state information according to at least one embodiments.

Referring to FIG. 5, there is a method 500 for monitoring a fleet of self-driving vehicles. According to some embodiments, all or parts of the method 500 may be executed by a fleet-management system, server, or one or more vehicles. According to some embodiments, all or parts of the method 500 may be executed using a system storage component. According to some embodiments, the method 500, or its constituent steps, may be executed along with or as a part of the method 400 or its constituent steps.

The method 400 may begin at step 510 when outliers have been identified and/or verified. According to some embodiments, the identification and/or verification of outliers may be done as was described for step 420 of method 400. According to some embodiments, the step 510 may correspond to identification and verification of outliers in current state information as in the step 420, such that the subsequent steps 512 to 518 generally correspond to or further describe step 426.

At step 512, an outlier type and/or severity may be determined. For example, an outlier type may be "vehicle" indicating that the outlier pertains to the vehicle status information of a particular vehicle. An outlier type may be "environment" indicating that the outlier pertains to the environment status information collected by a particular vehicle or the aggregate environment status information collected by the fleet of vehicles. An outlier type may be "fleet performance" indicating that the outlier pertains to the fleet performance metric information of the fleet of vehicles or the directives provided to same.

According to some embodiments, the type of outlier may be based on detailed information pertaining to the relevant vehicle state information, environment state information, and fleet performance metric information. For example, if the outlier pertains to vehicle state information related to vehicle hardware, the outlier type may be "vehicle—hardware". If the outlier pertains to vehicle state information related to a mapping error, the outlier type may be "vehicle—mapping". According to some embodiments, there may be an outlier type for each vehicle status type and/or environmental status type and/or fleet-performance metric. In other words, a unique outlier type may be defined for every characteristic sensed by the vehicle's sensors (vehicle sensors and environment sensors) as well as data derived from these characteristic (e.g. fleet performance metrics). According to some embodiments, an outlier type may include a group or class of characteristics and/or data derived from the characteristics. Other outlier types may be understood based on these examples.

The outlier severity may be determined based on a graduated scale. For example, the scale may be 1 to 5, with 1 being the least severe and 5 being the most severe. Any number of graduations on the scale may be used, and the scale need not be defined numerically. Generally, the scale is used to determine an escalation path of different escalation levels, so the scale may also be reflected based on roles, such as, in order of severity: "technician", "engineering", "management", "executive".

At step 514, one or more user roles are identified based on the outlier type and/or severity. User roles and/or groups of user roles may be assigned for notifications associated with a particular outlier type. Furthermore, for a given outlier type user roles and/or groups of user roles may be assigned for notifications associated with a particular severity level, thereby creating an escalation path based on severity. Generally, the type and severity level of an outlier may be associated with an escalation level representing the role that is to be notified of the outlier.

Various non-exhaustive examples are shown in Table 1 below. According to some embodiments, databases, look-up tables, and other data structures and associations may be implemented using non-transitory computer-readable media on any or all of the system storage component, fleet-management system, server, and vehicles.

TABLE 1

Examples of Notification Assignments

|  | Hardware Malfunction | Unknown Object | Takt Time |
|---|---|---|---|
| Level 1 | Maintenance Technician | Production Team Lead | Production Team Lead |
| Level 2 | Maintenance Technician Vendor Support Line | n/a | Production Manager Engineering Manager Logistics Manager |
| Level 3 | Maintenance Technician Vendor Support Line Engineering Manager | n/a | Management Team Executive Team |

Table 1 provides notification assignments for three types of outliers, and for three levels of severity for the sake of simplicity and illustration. Any number of outlier type and severity levels is possible. Each column of the table represents an outlier type: hardware malfunction, unknown object detected in the environment, and takt time. The "hardware malfunction" outlier type is based on vehicle state information. The "unknown object" outlier type is based on environment state information. The "takt time" outlier type is based on fleet-performance metrics.

For example, the hardware malfunction outlier type may be based on one or more type of vehicle state information such as the heat of a motor, or the status of a LiDAR sensor. In the example of the heat of a motor, Level 1 severity may correspond to a threshold value of ten degrees above the mean motor temperature (i.e. the reference data), which is known to be a temperature at which the motor can operate without failure, though a problem with the motor (or another component) may exist. Level 2 severity may correspond to a threshold value of twenty-five degrees above the mean motor temperature, which is known to be a temperature at which critical failure of the motor may be imminent if the temperature continues to rise. Level 3 severity may correspond to a threshold value of fifty degrees above the mean motor temperature, which is known to be a temperature at which the motor will definitely fail.

In the example of the hardware malfunction determined by motor temperature, notifications can be generated for each role according to Table 1. Thus, if the outlier (motor temperature as a type of vehicle state information) corresponds to level 1 severity, a maintenance technician within the facility may be notified. In response, the maintenance technician may investigate the particular vehicle associated with the outlier. If the outlier corresponds to level 2 severity, then the maintenance technician may be notified, and, additionally, the vendor's customer-support line may be notified as well, since there may be a need for technical support from the vehicle vendor and/or a need for the vendor to get a spare part (e.g. motor) prepared to ship to the facility. If the outlier corresponds to level 3 severity, then the maintenance technician and vendor support line may be notified, and, additionally, the engineering manager may be notified, since level 3 severity may indicate an imminent need to find a replacement vehicle and/or provide immediate repairs to the motor of the vehicle associated with the outlier.

In the example provided, the "unknown object" outlier type only has one level of severity. As such, whenever an unknown object is detected within a vehicle's environment, a Production Team Lead is notified, who can attend to the location of the unknown object in order to determine whether further action is required to move the object in order to improve operation of the fleet and the overall facility processes.

Other examples for an "unknown object" outlier type are possible, which may include more than one level of severity. For example, the "unknown object" outlier type, which related to environment state information, may be determined based on the environment state information from more than one vehicle, such as the aggregate fleet environment state information. As such, different severity levels may be determined, for example, based on the size of the unknown object detected, whether the unknown object is in a high-traffic or otherwise critical zone within the facility, the duration of time for which the unknown object has been detected, and the number of vehicles that have detected the unknown object.

The "takt time" outlier type shown in Table 1 represents a fleet-performance metric related to the average time duration between the start of one production cycle and the start of the next production cycle, for example, on an assembly line. This type of fleet-performance metric, and others, may be derived based on vehicle state information as previously described.

In the example of the takt time, Level 1 severity may correspond to a threshold value of thirty seconds above the mean takt time (i.e. the reference data), which may be a target takt time, or may be determined based on previously-collected vehicle state information pertaining to known-good takt times. This threshold may be chosen, for example, because it is understood to be related to minor production problems such as materials-supply delays, or human errors and productivity delays. Level 2 severity may correspond to a threshold value of two minutes above the mean takt time. This threshold may be chosen, for example, because it is understood to be related to production problems caused by equipment malfunctions. Level 3 severity may correspond to a threshold value of five minutes above the mean takt time. This threshold may be chosen, for example, because it is understood to be related to sever production problems and/or a takt time that, if not corrected, will cause severe commercial and/or logistical and/or legal risk to the organization.

In the example of takt times, notifications can be generated for each role according to Table 1. Thus, if the outlier corresponds to level 1 severity, a Production Team Lead within the facility may be notified. In response, the Production Team Lead may investigate the particular cause of the production slow down (i.e. increase in takt time) and remediate as necessary. If the outlier corresponds to level 2 severity, then the Production Manager, Engineering Manager, and Logistics Manager may be notified, since production management and engineering may be necessary in order to correct the problem, and production management and logistics management may need to adjust other production-dependent plans accordingly. If the outlier corresponds to level 3 severity, then the Management Team and Executive Team may be notified, since level 3 severity may indicate an imminent failure of the facility to meet essential production levels, which may have severe legal and commercial consequences. In this example, the Management Team and the Executive Team represent groups of roles. For example, the Management Team may include the roles of the Production Manager, Engineering Manager, and Logistics Manager that are individually listed for severity level 2, as well as other management roles.

At step 518, the notifications are addressed for the user devices associated with the identified user roles. According to some embodiments, each user role may be associated with one or more addresses for communications. For example, an address for communication may be a telephone number, an email address, an instant-messaging user account address, or other means of uniquely identifying and/or contacting a unique member of a communications network.

At step 520, the notifications are transmitted to the respective user devices according to the addresses determined in step 518. According to some embodiments, different types of communications may be sent based on role and/or the preferences of the individuals in a particular role. For example, a notification of a level 3 severity outlier for takt time may be sent as a text message (e.g. using SMS) to the mobile phone of a Chief Operations Officer, while a notification of a level 1 severity outlier for hardware malfunction may be sent to a computer terminal or display wall in a monitoring or control room that is staffed by the on-duty maintenance technician.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

As used herein, the term "media" generally means "one medium or more than one medium".

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the programmable computers may be a server, network appliance, embedded device, computer expansion module, a personal computer, laptop, a wireless device or any other computing device capable of being configured to carry out the methods described herein.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

We claim:

1. A method for monitoring a fleet of self-driving vehicles, comprising:
 autonomously navigating a self-driving vehicle in an environment;
 collecting current state information using at least one sensor of the self-driving vehicle;
 comparing the current state information with reference data;
 based on the comparing, determining whether outlier data exists within the current state information; and
 in response to determining that outlier data does not exist within the current state information, updating the reference data based on the current state information;
 otherwise in response to determining that outlier data does exist:
  determining at least one property of the outlier data;
  associating the determined at least one property of the outlier data to an escalation level;
  identifying one or more user roles associated with the escalation level; and
  generating an alert based on the identified user roles.

2. The method of claim 1, wherein:
 the current state information consists of current vehicle state information pertaining to the self-driving vehicle;
 the reference data comprises reference vehicle data; and
 the sensor is a vehicle sensor.

3. The method of claim 2, further comprising:
 collecting current environment state information pertaining to the environment; and
 comparing the current environment state information with reference environment data,
 wherein identifying outlier data comprises identifying outlier data in at least one of the current vehicle state information based on the reference vehicle data and the current environment state information based on the reference environment data.

4. The method of claim 1, wherein:
the current state information consists of current environment state information pertaining to the environment;
the reference data comprises reference environment data; and
the sensor is an environment sensor.

5. The method of claim 1, wherein identifying the outlier data comprises:
calculating an anomaly within the current state information based on the reference data using one or more processors;
transmitting a verification message to at least one user device based on the anomaly;
receiving a verification confirmation from the at least one first monitoring device; and
determining the outlier data based on the anomaly and the verification confirmation.

6. The method of claim 1, further comprising, prior to collecting the current state information:
collecting preliminary state information using the sensor;
comparing the preliminary state information with the reference data;
determining that the preliminary state information does not comprise preliminary outlier data; and
updating the reference data based on the preliminary state information.

7. The method of claim 1, wherein reference data is collected by other vehicles and in one or more other environments.

8. The method of claim 1, wherein the reference data comprises one of an average, mean, deviation, dispersion or variation of various data.

9. A system for monitoring a fleet of self-driving vehicles, comprising:
one or more self-driving vehicles each having at least one sensor for collecting current state information;
a fleet-management system in communication with the one or more self-driving vehicles;
one or more user devices in communication with the fleet-management system; and
a non-transient computer-readable media for storing reference data in communication with the fleet-management system;
wherein each of the one or more self-driving vehicles is configured to collect the current state information and transmit the current state information to the fleet-management system;
wherein the fleet-management system is configured to:
receive the reference data from the non-transient computer-readable media;
receive the current state information from a self-driving vehicle of the one or more self-driving vehicles;
compare the current state information with the reference data;
based on the comparing, determine whether outlier data exists in the current state information; and
in response to determining that no outlier data exists in the current state information, updating the reference data based on the current state information;
otherwise in response to determining that outlier data does exist:
determine at least one property of the outlier data;
associate the determined at least one of property of the outlier data to an escalation level;
identify one or more user roles associated with the escalation level; and
generate an alert based on the identified user roles.

10. The system of claim 9, wherein:
the current state information consists of current vehicle state information pertaining to the self-driving vehicle;
the reference data comprises reference vehicle data; and
the sensor comprises a vehicle sensor.

11. The system of claim 10 wherein:
the sensor further comprises an environment sensor;
the reference data further comprises reference environment data;
the self-driving vehicle is further configured to collect current environment state information pertaining to the environment using the environment sensor;
the fleet-management system is further configured to compare the current environment state information with the reference environment data;
the fleet-management system configured to identify the outlier data comprises the fleet-management system configured to identify the outlier data in at least one of the current vehicle state information based on the reference vehicle data and the current environment state information based on the reference environment data.

12. The system of claim 9, wherein:
the current state information consists of current environment state information pertaining to the environment;
the reference data comprises reference environment data; and
the sensor is an environment sensor.

13. The system of claim 9, wherein the fleet-management system configured to identify the outlier data further comprises the fleet-management system configured to:
calculate an anomaly within the current state information based on the reference data;
transmit a verification message to at least one user device selected from the one or more user devices based on the anomaly;
receive a verification confirmation from the at least one first monitoring device; and
determine the outlier data based on the anomaly and the verification confirmation.

14. The system of claim 9, wherein reference data is collected by other vehicles and in one or more other environments.

15. The system of claim 9, wherein the reference data comprises one of an average, mean, deviation, dispersion or variation of various data.

16. A method for monitoring a fleet of self-driving vehicles, comprising:
transmitting a respective mission to at least one self-driving vehicle of the fleet using a fleet-management system;
executing the respective mission by autonomously navigating the at least one self-driving vehicle according to the respective mission;
collecting current state information from the at least one self-driving vehicle based on the executing the respective mission;
determining current fleet-performance metric information based on the current state information;
comparing the current fleet-performance metric information with reference data;
based on the comparing, determining whether outlier data exists in the current fleet-performance metric information;
in response to determining that no outlier data exists in the current fleet-performance metric information, updating the reference data based on current fleet-performance metric information;
otherwise in response to determining that outlier data exists:
  determining at least one property of the outlier data;
  associating the at least one property of the outlier data to an escalation level;
  identifying one or more user roles associated with the escalation level; and
  generating an alert based on the identified user roles.

17. The method of claim 16, wherein identifying the outlier data comprises:
  calculating an anomaly within the current state information based on the reference data using one or more processors;
  transmitting a verification message to at least one user device based on the anomaly;
  receiving a verification confirmation from the at least one user device; and
  determining the outlier data based on the anomaly and the verification confirmation.

18. The method of claim 16, further comprising, prior to transmitting the respective mission to the at least one self-driving vehicle:
  transmitting a respective preliminary mission to the at least one self-driving vehicle of the fleet using the fleet-management system;
  executing the respective preliminary mission;
  collecting preliminary state information from the at least one self-driving vehicle based on the executing the respective preliminary mission;
  determining preliminary fleet-performances metric information based on the preliminary state information;
  comparing the preliminary fleet-performance metric information with the reference data;
  determining that the preliminary fleet-performance metric information does not comprise preliminary outlier data; and
  updating the reference data based on the preliminary fleet-performance metric information.

19. The method of claim 16, wherein reference data is collected by other vehicles and in one or more other environments.

20. The method of claim 16, wherein the reference data comprises one of an average, mean, deviation, dispersion or variation of various data.

* * * * *